(12) United States Patent
Harris et al.

(10) Patent No.: US 11,349,856 B2
(45) Date of Patent: May 31, 2022

(54) EXPLOIT KIT DETECTION

(71) Applicant: International Business Machines Corporation, Armonk, NY (US)

(72) Inventors: Bradley E. Harris, Sandy Springs, GA (US); Moazzam Khan, Marietta, GA (US); Preeti Ravindra, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 713 days.

(21) Appl. No.: 16/262,340

(22) Filed: Jan. 30, 2019

(65) Prior Publication Data

US 2020/0244686 A1    Jul. 30, 2020

(51) Int. Cl.
| | | |
|---|---|---|
| *H04L 9/40* | (2022.01) | |
| *G06N 20/00* | (2019.01) | |
| *G06F 16/955* | (2019.01) | |
| *G06N 7/00* | (2006.01) | |
| *G06N 20/20* | (2019.01) | |

(52) U.S. Cl.
CPC ...... *H04L 63/1425* (2013.01); *G06F 16/9566* (2019.01); *G06N 7/005* (2013.01); *G06N 20/00* (2019.01); *G06N 20/20* (2019.01); *H04L 63/145* (2013.01); *H04L 63/1416* (2013.01)

(58) Field of Classification Search
CPC ............. G06F 16/9566; G06F 12/0813; G06F 21/554; G06F 21/562; G06F 21/563; G06N 7/005; G06N 20/00; G06N 20/20; G06N 5/047; H04L 63/1416; H04L 63/1425; H04L 63/145; H04L 63/1491; H04L 61/1511; H04L 67/02; G06K 9/6228

See application file for complete search history.

(56) References Cited

U.S. PATENT DOCUMENTS

| | | |
|---|---|---|
| 8,086,599 B1 | 12/2011 | Heymans |
| 8,161,548 B1 * | 4/2012 | Wan ...................... G06K 9/6228 726/22 |
| 8,850,583 B1 | 9/2014 | Nelson et al. |
| 9,825,976 B1 * | 11/2017 | Gomez ................. G06F 21/554 |
| 9,892,253 B1 | 2/2018 | Mehr et al. |

(Continued)

FOREIGN PATENT DOCUMENTS

GN    106169050 A    11/2016

OTHER PUBLICATIONS

International Search Report dated May 9, 2020 in corresponding International Patent Application No. PCT/IB2020/050292.

(Continued)

*Primary Examiner* — Le H Luu
(74) *Attorney, Agent, or Firm* — Troutman Pepper Hamilton Sanders LLP

(57) ABSTRACT

Embodiments provide a computer implemented method in a data processing system comprising a processor and a memory comprising instructions, which are executed by the processor to cause the processor to implement the method of identifying an exploit kit, the method comprising: receiving, by the processor, a web page; extracting, by the processor, a plurality of features of the web page; and determining, by the processor, whether the web page is associated with an exploit kit, through an ensemble classifier model trained using the extracted features.

24 Claims, 10 Drawing Sheets

(56) References Cited

U.S. PATENT DOCUMENTS

| | | | |
|---|---|---|---|
| 10,728,268 B1* | 7/2020 | Hagen | G06N 5/047 |
| 11,128,664 B1* | 9/2021 | Andersson | H04L 67/02 |
| 2008/0301281 A1 | 12/2008 | Wang et al. | |
| 2013/0133072 A1* | 5/2013 | Kraitsman | H04L 63/1425 |
| | | | 726/23 |
| 2014/0189864 A1 | 7/2014 | Wang et al. | |
| 2015/0261955 A1* | 9/2015 | Huang | G06F 21/562 |
| | | | 726/23 |
| 2016/0156656 A1* | 6/2016 | Boggs | H04L 63/1425 |
| | | | 726/25 |
| 2016/0212153 A1* | 7/2016 | Livshits | G06F 21/563 |
| 2016/0337388 A1* | 11/2016 | Hu | H04L 63/1491 |
| 2017/0041333 A1* | 2/2017 | Mahjoub | H04L 61/1511 |
| 2017/0195353 A1* | 7/2017 | Taylor | G06F 12/0813 |
| 2017/0244749 A1* | 8/2017 | Shulman | H04L 63/1425 |

OTHER PUBLICATIONS

Davide Canali, Marco Cova, Giovanni Vigna, Christopher Kruegel. Prophiler: a fast filter for the large-scale detection of malicious web pages. Proceedings of the 20th international conference on World wide web, Mar. 2011, Hyderabad, India. ACM, pp. 197-206, 2011, <10.1145/1963405.1963436>. <hal-00727271>.

Marco Cova, Christopher Kruegel, and Giovanni Vigna. 2010. Detection and analysis of drive-by-download attacks and malicious JavaScript code. In Proceedings of the 19th international conference on World wide web (WWW '10). ACM, New York, Ny, USA, 281-290. DOI=http://dx.doi.org/10.1145/1772690.1772720.

Tongbo Luo, Xing Jin Next Generation of Exploit Kit Detection by Building Simulated Obfuscators. Blackhat Conference, 2016, 1-9.

* cited by examiner

EXPLOIT KIT DETECTION

TECHNICAL FIELD

The present disclosure relates generally to a system, method, and computer program product that are used to identify whether a web page is an exploit kit or not.

BACKGROUND

Exploit kits are web pages or scripts of the web pages found on the World Wide Web and contain browser-based exploits. An exploit is an object, such as a piece of code or string of commands, which takes advantage of a vulnerability in a program to force it to behave unexpectedly.

Browser exploits, particularly exploits residing in common plugins such as Flash Player, are prevalent exploits against various browsers. Exploit kits are used to spread malwares to victim browsers by taking advantage of these exploits. However, these exploit kits, i.e., the web pages or the scripts of the web pages, are usually heavily obfuscated, and thus, signature-based detection of exploit kits is impractical. Other techniques, such as Entropy, have not proven to be reliable against more complex obfuscation engines (e.g., packers). Further, identification of exploit kits in form of scripts through an intrusion prevention system (IPS) is not straightforward due to encodings and escape sequences. Furthermore, a faster algorithm is desired to be included in an IPS.

SUMMARY

Embodiments provide a computer implemented method in a data processing system comprising a processor and a memory comprising instructions, which are executed by the processor to cause the processor to implement the method of identifying an exploit kit, the method comprising: receiving, by the processor, a web page; extracting, by the processor, a plurality of features of the web page; and determining, by the processor, whether the web page is an exploit kit, through a trained ensemble classifier model based on the extracted features.

Embodiments further provide a computer implemented method, wherein the plurality of features include one or more of the number of unique n-grams, the total number of n-grams, a ratio of the number of unique n-grams to the total number of n-grams, a file size, and a ratio of the file size to the total number of n-grams.

Embodiments further provide a computer implemented method, wherein the n-grams are bigrams.

Embodiments further provide a computer implemented method, further comprising: identifying, by the processor, the number of links in the web page; and determining, by the processor, the web page as the exploit kit if the number of links is zero.

Embodiments further provide a computer implemented method, further comprising: identifying, by the processor, the number of images in the web page; and determining, by the processor, the web page as the exploit kit if the number of images is zero.

Embodiments further provide a computer implemented method, further comprising: identifying, by the processor, the number of links and the number of images in the web page; and determining, by the processor, the web page as the exploit kit if both the number of links and the number of images are zero.

Embodiments further provide a computer implemented method, further comprising: identifying, by the processor, whether the web page is one of top ten thousand web pages; and determining, by the processor, that the web page is not the exploit kit if the web page is one of top ten thousand web pages.

Embodiments further provide a computer implemented method, further comprising: identifying, by the processor, whether a size of the web page is less than 1024 bytes; and eliminating, by the processor, the web page if the size of the web page is less than 1024 bytes.

Embodiments further provide a computer implemented method, further comprising: eliminating, by the processor, the web page if the web page is a non-text based web page including compressed objects or executable binary contents.

Embodiments provide a computer program product for identifying an exploit kit, the computer program product comprising a computer readable storage medium having program instructions embodied therewith, the program instructions executable by a processor to cause the processor to: receive a web page; extract a plurality of features of the web page, wherein the plurality of features include one or more of the number of unique bigrams, the total number of bigrams, a ratio of the number of unique bigrams to the total number of bigrams, a file size, and a ratio of the file size to the total number of bigrams; and determine whether the web page is an exploit kit, through a trained ensemble classifier model based on the extracted features.

Embodiments further provide a computer program product for identifying an exploit kit, wherein the trained ensemble classifier model comprises a model generated by a Naïve Bayes classifier and a random rules classifier.

Embodiments further provide a computer program product for identifying an exploit kit, wherein the processor is further caused to: continue to train the trained ensemble classifier model using the determined web page.

Embodiments further provide a computer program product for identifying an exploit kit, wherein the processor is further caused to: continue to train the trained ensemble classifier model using one or more new exploit kits.

Embodiments further provide a computer program product for identifying an exploit kit, wherein the processor is further caused to: remove old exploit kits from the trained ensemble classifier model.

Embodiments further provide a computer program product for identifying an exploit kit, wherein the processor is further caused to: replace the trained ensemble classifier model with a new ensemble classifier model, wherein the new ensemble classifier model is trained by one or more new exploit kits.

Embodiments further provide a computer program product for identifying an exploit kit, wherein the processor is further caused to: identify the number of links and the number of images in the web page; and determine the web page as the exploit kit if both the number of links and the number of images are zero.

Embodiments further provide a computer program product for identifying an exploit kit, wherein the processor is further caused to: identify whether the web page is one of top ten thousand web pages; and determine that the web page is not the exploit kit if the web page is one of top ten thousand web pages.

Embodiments further provide a computer program product for identifying an exploit kit, wherein the processor is further caused to: identify whether a size of the web page is less than 1024 bytes; and eliminate the web page if the size of the web page is less than 1024 bytes.

Embodiments provide a system for identifying an exploit kit, comprising: a processor configured to: receive a web page; extract a plurality of features of the web page, wherein the plurality of features include one or more of the number of unique bigrams, the total number of bigrams, a ratio of the number of unique bigrams to the total number of bigrams, a file size, and a ratio of the file size to the total number of bigrams; and determine whether the web page is the exploit kit, through a trained ensemble classifier model based on the extracted features, wherein the trained ensemble classifier model comprises a model generated by a Naïve Bayes classifier and a random rules classifier.

Embodiments further provide a system for identifying an exploit kit, wherein the processor is further configured to: continue to train the trained ensemble classifier model using the determined web page and additional one or more new exploit kits.

Embodiments further provide a system for identifying an exploit kit, the processor is further configured to: identify whether the web page is one of top ten thousand web pages; determine that the web page is not the exploit kit if the web page is one of top ten thousand web pages; identify the number of links and the number of images in the web page; and determine the web page as the exploit kit if both the number of links and the number of images are zero.

Embodiments provide a system for identifying an exploit kit, comprising: a web page identification module, configured to identify whether a web page is one of top ten thousand web pages and determine that the web page is not the exploit kit if the web page is one of top ten thousand web pages; a trained ensemble classifier model including a model generated by a Naïve Bayes classifier and a random rules classifier, the trained ensemble classifier model configured to determine whether the web page is the exploit kit; a filter including a link_count filter and an image-count filter, the filter configured to identify the number of links and the number of images in the web page and determine the web page as the exploit kit if both the number of links and the number of images are zero.

Embodiments further provide a system for identifying an exploit kit, wherein the trained ensemble classifier model is continuously trained using the determined web page and additional one or more new exploit kits.

Embodiments provide an intrusion prevention system, comprising a system for identifying an exploit kit, wherein the system for identifying an exploit kit comprises: a processor configured to: receive a web page; extract a plurality of features of the web page, wherein the plurality of features include one or more of the number of unique bigrams, the total number of bigrams, a ratio of the number of unique bigrams to the total number of bigrams, a file size, and a ratio of the file size to the total number of bigrams; identify whether the web page is one of top ten thousand web pages; if the web page is one of top ten thousand web pages, determine that the web page is not the exploit kit; if the web page is not one of top ten thousand web pages, detect whether the web page is the exploit kit, through a trained ensemble classifier model based on the extracted features. The trained ensemble classifier model comprises a model generated by a Naïve Bayes classifier and a random rules classifier, and the trained ensemble classifier model is continuously trained using the determined web page and additional one or more new exploit kits. If the web page is detected by the trained ensemble classifier model as the exploit kit; identify the number of images in the web page. If the number of images is zero, determine the web page as the exploit kit; and block the web page if the web page is determined as the exploit kit.

Embodiments further provide an intrusion prevention system, the processor further configured to: identify whether a size of the web page is less than 1024 bytes; and if the size of the web page is less than 1024 bytes, eliminate the web page.

In another illustrative embodiment, a computer program product comprising a computer usable or readable medium having a computer readable program is provided. The computer readable program, when executed on a processor, causes the processor to perform various ones of, and combinations of, the operations outlined above with regard to the method illustrative embodiment.

In yet another illustrative embodiment, a system is provided. The system may comprise a processor configured to perform various ones of, and combinations of, the operations outlined above with regard to the method illustrative embodiments.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawing embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

Figure 1:
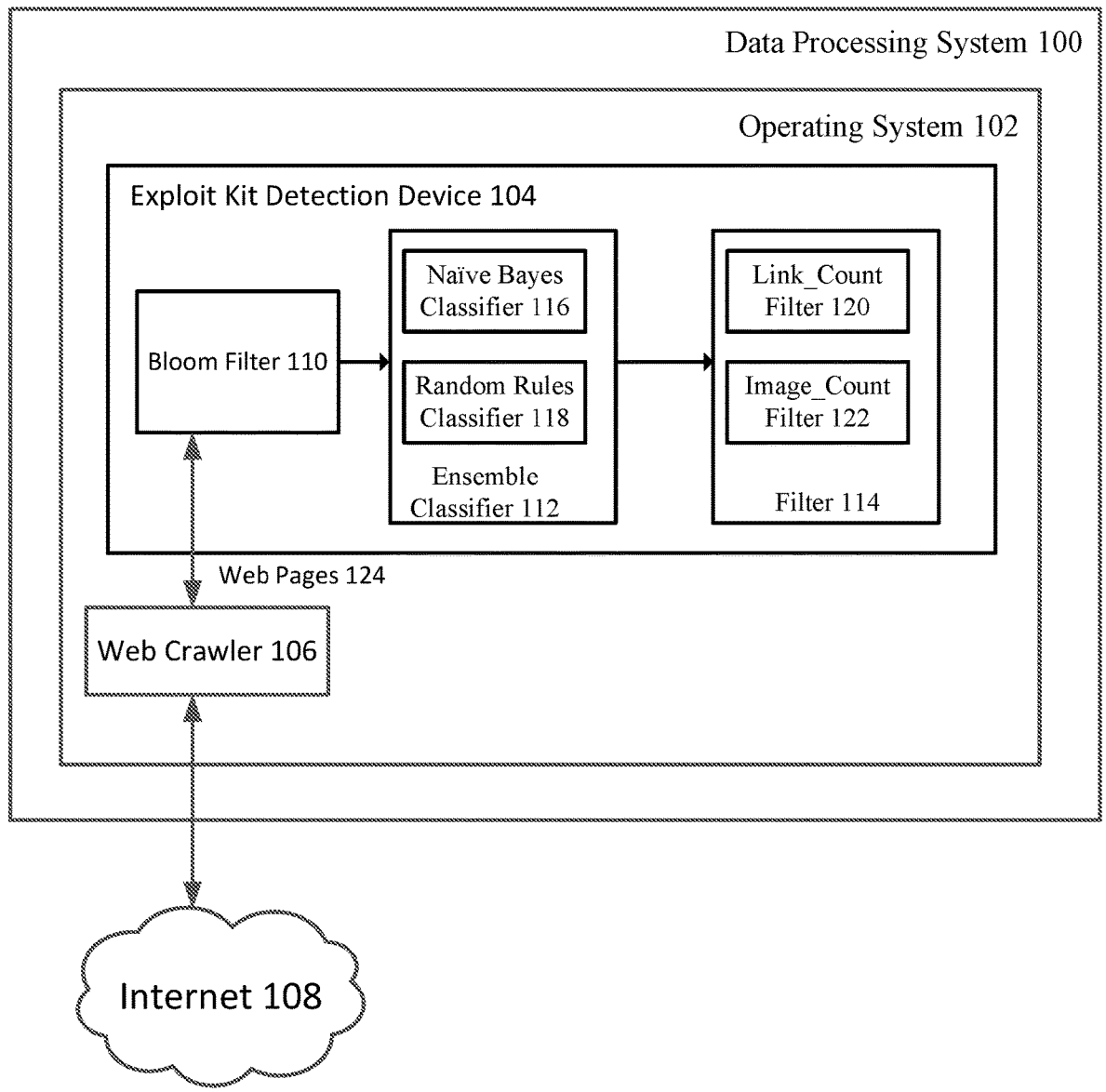
FIG. 1 depicts a block diagram of an example data processing system 100 in which an exemplary exploit kit detection device 104 is implemented.

Embodiments of the present invention may be a system, a method, and/or a computer program product. The computer program product may include a computer readable storage medium (or media) having computer readable program instructions thereon for causing a processor to carry out aspects of the present invention.

In an embodiment, a system, method, and computer program product for identifying whether a web page is an exploit kit or a "normal" web page, are disclosed. In an embodiment, a combination of detection strategies is used to accurately detect exploit kits. Specifically, in one embodiment, the Naïve Bayes classifier is used due to fast processing, a simple implementation and a high detection rate. To optimize the performance of the Naïve Bayes classifier and further reduce false positives, "Random Rules" is additionally utilized in one embodiment as a meta-classifier. Further, in some embodiments, two features (attributes), i.e., the number of images in a web page img_count and the number of links in a web page link_count, can be used independently, or in combination, to further reduce the false positive rate to about 0.7%. Moreover, in some embodiments, a bloom filter, a hash set, a hash map, or Judy arrays can be used to identify top-ranked 10,000 sites (e.g., provided by Alexa™ company), so that common web sites (included in the top-ranked 10,000 sites) can be eliminated from the false positives, so that the false positive rate can be further reduced.

In a further embodiment, any web pages having a size less than 1024 bytes are eliminated. In an example, any web pages having a size less than 1024 bytes may be filtered out, because the web pages tend to be noises and meaningless if the size is less than 1024 bytes.

In an embodiment, any web pages that are not text-based are excluded. For example, web pages only containing images, and/or animations may be removed from consideration. Non-text based web pages, for example web pages having compressed objects or executable binary contents, generally have different lengths of meaningful tokens, and the Naïve Bayes classifier cannot work properly with the indefinite token length.

In an embodiment, a web page identification module, such as a bloom filter, a hash set, a hash map, or Judy arrays can be used to identify whether the web page is one of the top ten thousand web pages listed by Alexa company. If the web page is one of the top ten thousand web pages, then this web page is considered as a common web page and thus is not an exploit kit; while if the web page is not one of the top ten thousand web pages, then further steps are performed to detect whether the web page is an exploit kit. With the web page identification module, the probable immediate false positives can be eliminated. More particularly, a false positive is an error which improperly indicates presence of an exploit kit, when in reality it is not present, and thus a normal web page is mistaken for an exploit kit. The web page identification module can reduce the chance of this mistake by checking whether the web page is one of the top ten thousand web pages. In an embodiment, the bloom filter is a space-efficient probabilistic data structure that is used to test whether an element is a member of a set. In an embodiment, the hash set is a data structure which can hold hostnames/URLs mapped to a bit value.

In an embodiment, a machine learning model (an instance of a classifier, also referred to as "classifier model") is utilized to analyze the entire text of a web page to detect exploit kit patterns. In an embodiment, n-grams, instead of single tokens, is adopted in the machine learning model, because single tokens do not provide context information of a web page script. The n-grams can provide context information of a web page script, for distinguishing an exploit kit from normal web pages. N-grams are n consecutive words represented as a single analyzed token. In an example, near-word token bigrams (i.e., n is 2) are used to maintain the speed. Bigrams are two consecutive words represented as a single analyzed token, and the bigrams (2-grams) is used as a unit of tokenization due to low complexity and fast processing speed. In an embodiment, a streaming classifier (continuously learning) is used to deal with an exploit kit drift (the evolution of exploit kit patterns and structure). In an example, an ensemble classifier is used for more stability and accuracy.

In an embodiment, in order for a machine learning model to learn, a training set of web pages are provided to train the machine learning model, so that the machine learning model can classify web pages as exploit kits or "normal" web pages. After the machine learning model is trained, a new web page or a new set (test set) of web pages are further provided to test the machine learning model, so that the trained machine learning model can identify whether the new web page or each of the new set of web pages is an exploit kit or not.

In the first place, the training set and the test set are seeded with exploit kits and "normal" web pages. A web crawler is utilized to gather "normal" web pages and collect exploit kits for the training set, while another web crawler is utilized to gather "normal" web pages and collect exploit kits for the test set. The exploit kits can include Angler, exploit kits from NSS Labs testing, and the like.

In an embodiment, a classifier is used to distinguish "normal" web pages from exploit kits. The classifier uses the following features: unique n-grams, total n-grams, unique n-grams/total n-grams (i.e., a ratio of the number of unique n-grams to the total number of n-grams), file size, and file size/total n-grams (i.e., a ratio of the file size to the total number of n-grams). The features (also called attributes) of the classifier only depend on the number of unique bigrams and the total number of bigrams, and it is simple to keep track of the two numbers.

In an embodiment, the classifier can be an ensemble classifier. In a further embodiment, the ensemble classifier includes a Naïve Bayes classifier as a base classifier. The Naïve Bayes classifier is extremely fast and very simple to implement, which help in testing an unseen web page at a fast network speed. Further, the Naïve Bayes classifier is an "updateable" algorithm, which can learn from a single new sample (new web page) or multiple new samples (new web pages). Accordingly, transformations of exploit kits can be captured as they evolve.

The Naïve Bayes is a probabilistic classifier. The updateable version begins with a prior probability distribution, and each feature or attribute (e.g., unique n-grams, total n-grams, unique n-grams/total n-grams, file size, and file size/total n-grams) is mapped to a class in a predefined prior distribution, which is a Gaussian (Bell Curve) distribution. As classifier model is trained, probabilities of features are increased on the curve. At the end of the training, a new distribution is generated for the probabilities of each feature. The new distribution is smooth, so that arbitrary numeric values can be supplied.

Subsequently, Bayes Theorem is applied for each attribute independently. Bayes Theorem is described as follows:

P(specific_class|attribute_value) is the posterior probability of class specific_class given the predictor attribute_value;
P(specific_class) is the prior probability of class specific_class;
P(attribute_value|specific_class) is the probability of attribute_value given specific_class;
P(attribute_value) is the prior probability of attribute_value.

Given this notation, Bayes Theorem states that P(specific_class|attribute_value)=P(attribute_value|specific_class)*P(specific_class)/P(attribute_value).

Once the posterior probabilities for the specific classes are calculated for each attribute_value, a decision about which class the entire set of attributes belongs to is made.

In another embodiment, "Random Rules" is also included in the ensemble classifier as a meta-classifier to boost the performance of the Naïve Bayes classifier and reduce a false positive rate. The Random Rules classifier is also an updateable algorithm, which is an algorithm included in the Massive Online Analysis (MOA). The Random Rules classifier can also capture evolution of exploit kits as the Naïve Bayes classifier does. Similar to the Naïve Bayes classifier, the Random Rules classifier is also based upon a smaller set of attributes, and thus the evaluation through the Random Rules classifier is quick. The Random Rules classifier can dramatically cut the false positive rate. In an embodiment, the Random Rules classifier extracts a set of N attributes and divides them into N!/(N−2)!/2! subsets of N−2 attribute classifiers. In an example, N=5 (there are five attributes), 5!/(5−2)!/2!=10. Thus, ten three-attribute classifiers are generated from the original five attributes.

In an embodiment, the ensemble classifier model, including the model generated by the Naïve Bayes classifier and the Random Rules classifier, is trained to detect drift in exploit kits as they continue to evolve. The ensemble classifier model can be trained offline or online. In the offline mode, the ensemble classifier model needs to be trained with an entire data set. Every time a new machine learning model needs to be built, it should be batch trained with the entire data set. In the online mode, the ensemble classifier model can learn with incremental part of the data set (newly discovered exploit kits, referred to as "new samples"), instead of the entire data set. The ensemble classifier model will be updated to accommodate the new samples in an automatic mode.

In an embodiment, an additional filter is provided to further minimize false positives from the evaluation result of the base classifier and the meta-classifier. In particular, the number of links in a web page link_count, and the number of images in a web page img_count, can be utilized to reduce the false positive rate. Generally, real exploit kits have no links or images, and thus the number "0" can be used as a filter. Specifically, any web pages having no links or images may be true positives (real exploit kits as detected), while any web pages having one or more links or images may be false positives (mistaken for exploit kits).

FIG. 1 depicts a block diagram of an example data processing system 100 in which an exemplary exploit kit detection device 104 is implemented. As shown in FIG. 1, data processing system 100 is an example of a computer, such as a server or client, in which computer usable code or instructions implementing the process for illustrative embodiments of the present invention are located. In one embodiment, the data processing system 100 represents an intrusion detection system or intrusion prevention system. In another embodiment, the data processing system 100 represents a computing device, which implements operating system 102. In some embodiments, the operating system 102 can be Windows, Unix system or Unix-like operating systems, such as AIX, A/UX, HP-UX, IRIX, Linux, Minix, Ultrix, Xenix, Xinu, XNU, and the like.

In the depicted example, the exploit kit detection device 104, and the web crawler 106 run on the operating system 102. The web crawler 106 is integrated in a search engine and communicates with the internet 108. The web crawler 106 can obtain web pages 124 across the internet 108 and provide the obtained web pages 124, including "normal" web pages and exploit kits, to the exploit kit detection device 104. The exploit kit detection device 104 can detect whether each of the obtained web pages 124 is an exploit kit or not. The exploit kit detection device 104 includes the bloom filter 110, the ensemble classifier 112, and the filter 114. The ensemble classifier 112 further includes the Naïve Bayes classifier 116 and the Random Rules classifier 118. The filter 114 further includes the link-count filter 120 and the image-count filter 122. The bloom filter 110 identifies whether each of the obtained web pages 124 is one of the top ten thousand web pages listed by Alexa company. For each of the obtained web pages 124, if a web page is one of the top ten thousand web pages, then that web page is a "normal" web page, otherwise it may be an exploit kit. Then the obtained web pages 124 which are not one of the top ten thousand web pages (referred to as "the first web pages") are then sent to the ensemble classifier 112. The ensemble classifier 112 model were already trained by a huge amount of web pages including "normal" web pages and exploit kits. The trained ensemble classifier 112 model detects whether each of the first web pages is exploit kit or not. Then the web pages which are detected as exploit kits (referred to as "the second web pages") are then sent to the filter 114 to reduce false positives. Specifically, the filter 114 removes any web pages having one or more links (performed by the link-count filter 120) or/and images (performed by the image-count filter 122) from the second web pages, because real exploit kits generally have no links or images. The remaining web pages (referred to as "the third web pages") are web pages determined as exploit kits.

Figure 2:
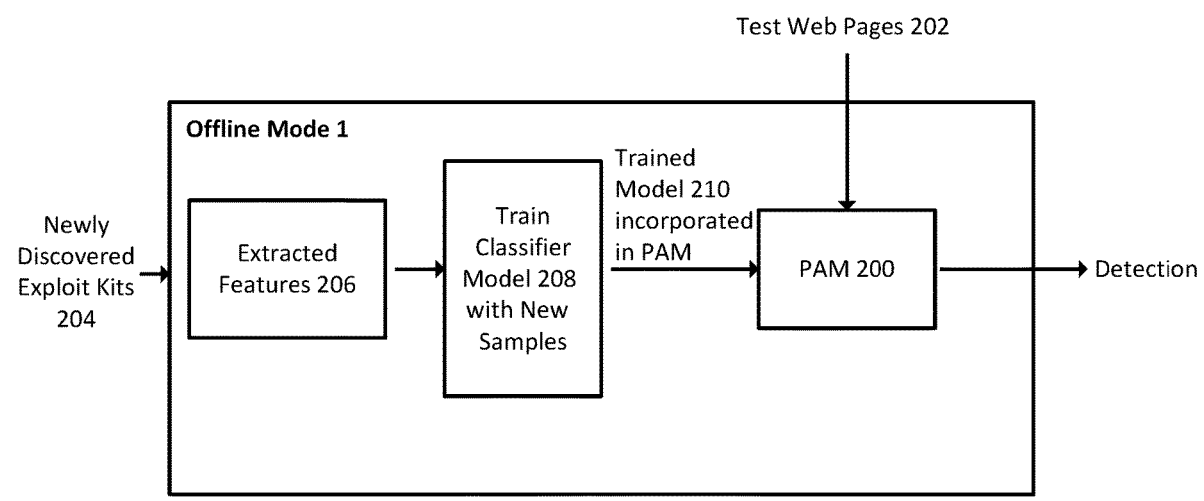
FIG. 2 depicts a block diagram of an example offline mode of training a classifier model, according to some embodiments described herein.

FIGS. 2-5 depict four exemplary modes of training the ensemble classifier 112 model. FIG. 2 depicts a block diagram of an example offline mode of training a classifier model, according to some embodiments described herein. As shown in FIG. 2, a new training set with the newly discovered exploit kits 204 is used to train the classifier model 208 (e.g., ensemble classifier 112 model as shown in FIG. 1). In this offline mode, the newly discovered exploit kits 204 have to reach a predetermined number to form a batch of newly discovered exploit kits 204. Specifically, features 206 are extracted from the newly discovered exploit kits 204, and the features of the newly discovered exploit kits 204 (i.e., new samples) form a new training set. The entire new training set is used to train the classifier model 208 and a new classifier model 210 is generated accordingly. The newly trained classifier model 210 which can detect newer exploit kits is incorporated in a protocol analysis module (PAM) 200 of an intrusion prevention system (IPS) to detect newer exploit kits in the test web pages 202. Specifically, the test web pages 202 are sent to the protocol analysis module (PAM) 200 of an IPS, and the newly trained classifier model 210 in the PAM 200 detects whether each of the test web pages 202 is an exploit kit or not. Because the newly discovered exploit kits 204 can be used to train the classifier model 208 to generate the newly trained classifier model 210, the evolution of exploit kits can be captured continuously. In an embodiment, the newly discovered exploit kits 204 are provided by a data curator (a person who monitors evolution/drift of exploit kits).

Figure 3:
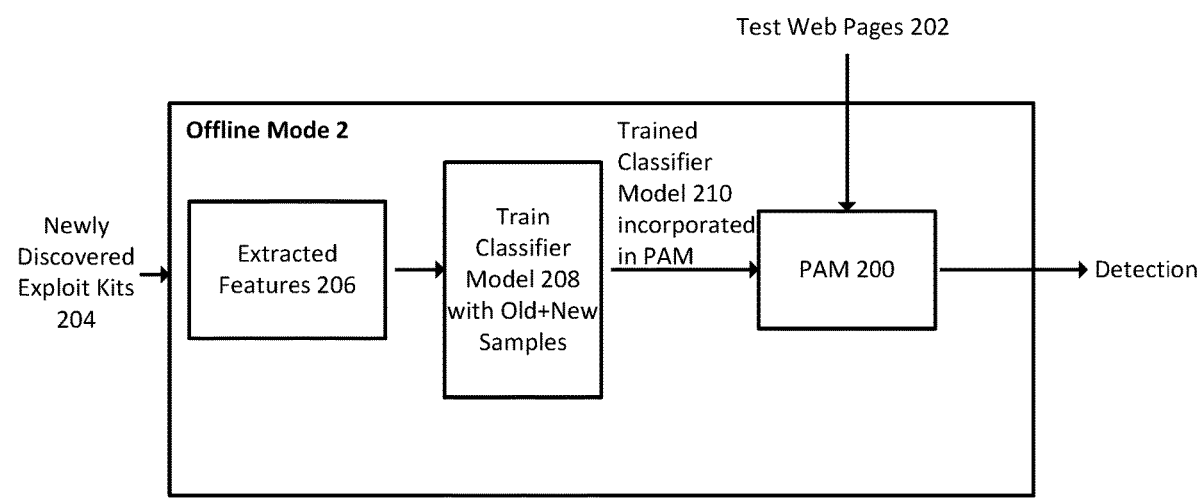
FIG. 3 depicts a block diagram of another example offline mode of training a classifier model, according to some embodiments described herein.

FIG. 3 depicts a block diagram of another example offline mode of training a classifier model, according to some embodiments described herein. As shown in FIG. 3, newly exploit kits 204 are added to the existing training set, which is used to train the classifier model 208 (e.g., ensemble classifier 112 model as shown in FIG. 1). In this offline mode, the newly discovered exploit kits 204 have to reach a predetermined number to form a batch of newly discovered exploit kits 204. Specifically, features 206 are extracted from the newly discovered exploit kits 204, and the features of the newly discovered exploit kits 204 (i.e., new samples) are added to an existing training set. The entire training set including the old exploit kits and the newly discovered exploit kits 204 is used to train the classifier model 208, and a new classifier model 210 is generated accordingly. The newly trained classifier model 210 which can detect newly exploit kits 204 is incorporated in the protocol analysis module (PAM) 200 of an IPS, and the newly trained classifier model 210 in the PAM 200 detects whether each of the test web pages 202 is an exploit kit or not. Because the newly discovered exploit kits 204 can be used to train the classifier model 208 to generate the newly trained classifier model 210, the evolution/drift of exploit kits can be captured continuously. In an embodiment, the newly discovered exploit kits 204 are provided by a data curator (a person who monitors evolution of exploit kits).

Figure 4:
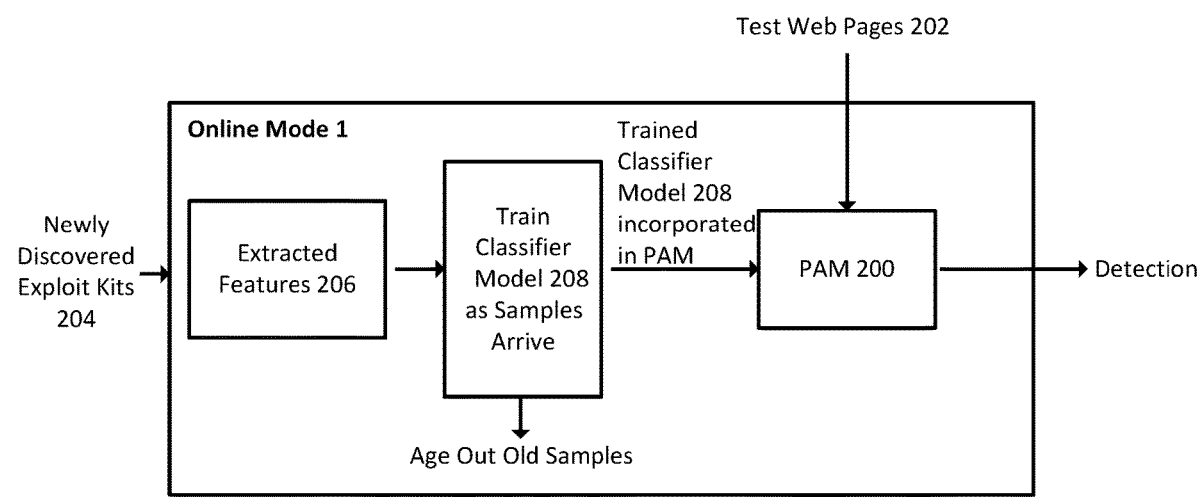
FIG. 4 depicts a block diagram of an example online mode of training a classifier model, according to some embodiments described herein.

FIG. 4 depicts a block diagram of an example online mode of training a classifier model, according to some embodiments described herein. As shown in FIG. 4, newly discovered exploit kits 204 are used to train the classifier model 208 (e.g., ensemble classifier 112 model as shown in FIG. 1). Specifically, when the newly discovered exploit kits 204 become available, features 206 are extracted from the newly discovered exploit kits 204, and the features of the newly discovered exploit kits 204 are immediately used to train the existing classifier model 208. The trained classifier model 208 which can detect newly discovered exploit kits 204 is incorporated in the protocol analysis module (PAM) 200 of an IPS, and the trained classifier model 208 in the PAM 200 detects whether each of the test web pages 202 is an exploit kit or not. In this embodiment, the newly discovered exploit kits 204 can be immediately used to train the existing classifier model 208 when they are available. It is unnecessary to wait until a predetermined number of newly discovered exploit kits 204 are available to form a new training set. In other words, it is unnecessary to collect the newly discovered exploit kits 204 in batches. As long as one or more newly discovered exploit kits 204 are available, they can be used to train the classifier model 208 immediately. The classifier model 208 can eliminate older exploit kit samples while automatically learning an evolution/drift of exploit kits. In this embodiment, the classifier model 208 does not have to be trained over the entire data set again as is the case with the offline mode. Additionally, the older classifier model does not have to be replaced with the newly trained classifier model in the PAM 200, as is the case with the offline mode. No new classifier model is generated, instead, the existing classifier model 208 is kept updated with the newly discovered exploit kits 204. Because the newly discovered exploit kits 204 can be immediately used to train the existing classifier model 208, the evolution of exploit kits can be captured continuously. In an embodiment, the newly discovered exploit kits 204 are provided by a data curator (a person who monitors evolution of exploit kits).

Figure 5:
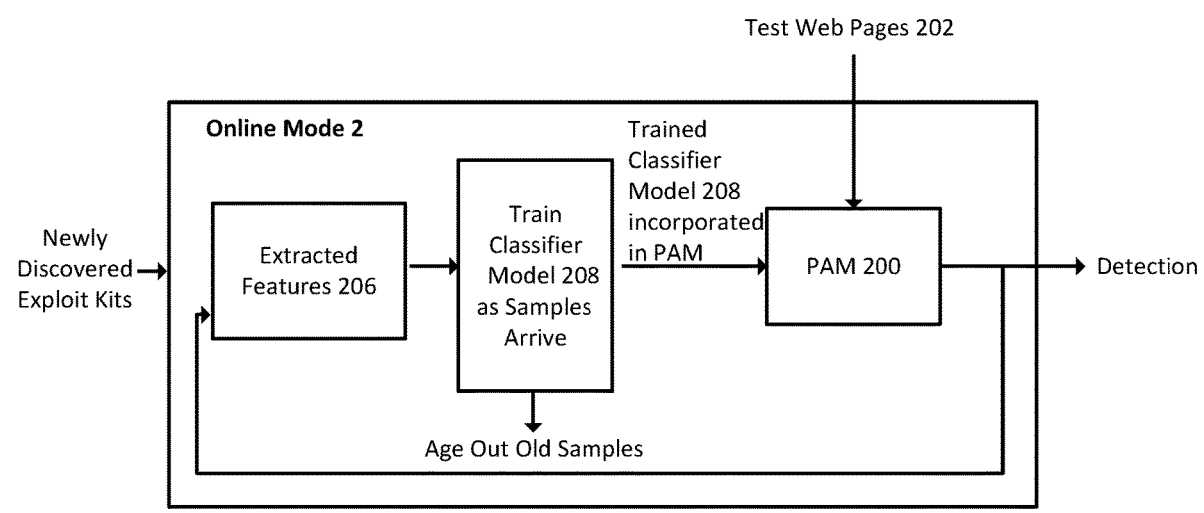
FIG. 5 depicts a block diagram of another example online mode of training a classifier model, according to some embodiments described herein.

FIG. 5 depicts a block diagram of another example online mode of training a classifier model, according to some embodiments described herein. As shown in FIG. 5, differently from the example online mode of FIG. 4, if the classifier model 208 incorporated in the PAM 200 identifies any web pages as exploit kits, these identified exploit kits are then fed as new training data to the existing classifier model 208. Similarly to the online mode of FIG. 4, the nature of the classifier model 208 will help learn the drift/evolution of exploit kits without being trained with the entire data set again. Further, the drift/evolution of exploit kits can be learnt without replacing the previous classifier model in the PAM 200 with a new classifier model. Because the newly discovered exploit kits 204 can be immediately used to train the existing classifier model 208, the evolution of exploit kits can be captured continuously. Further, since the exploit kits identified by the PAM 200 are automatically fed as new training data to the existing classifier model 208, no data curator is required in this online mode.

Figure 6:
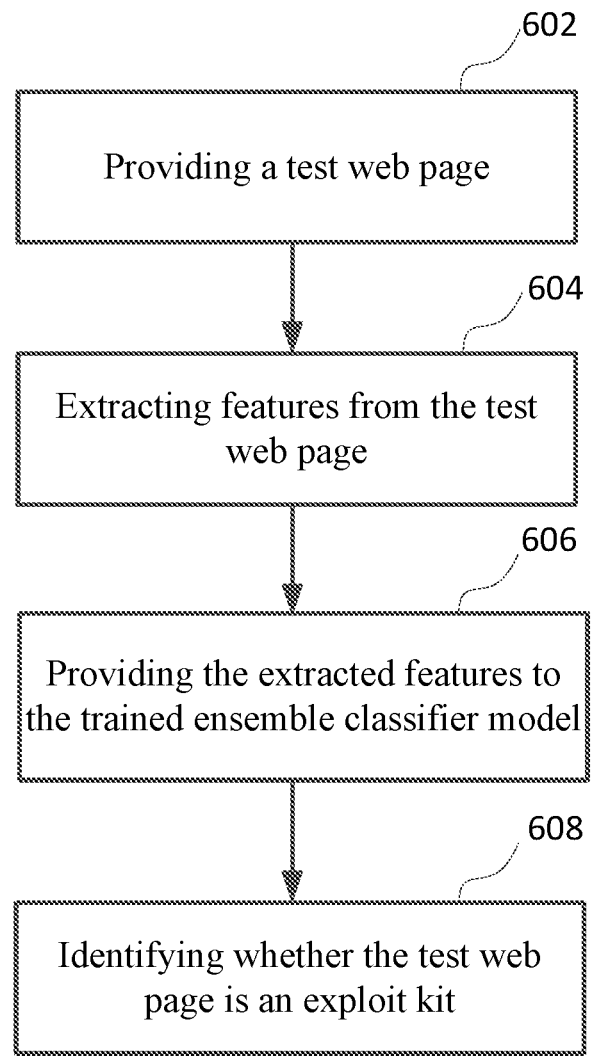
FIG. 6 is an example flowchart illustrating a method 600 of detecting an exploit kit, according to embodiments herein.

FIG. 6 is an example flowchart illustrating a method 600 of detecting an exploit kit, according to embodiments herein. At step 602, a test web page is provided to an intrusion prevention system (IPS). At step 604, the IPS extracts features of the test web page. In an embodiment, the extracted features include the number of the unique bigrams, the total number of bigrams, a ratio of the number of the unique bigrams to the total number of bigrams, the file size, and a ratio of the file size to the total number of bigrams. At step 606, the extracted features are sent to the trained ensemble classifier model incorporated in the PAM of the IPS. At step 608, the trained ensemble classifier model identifies whether the test web page is an exploit kit or not.

Figure 7:
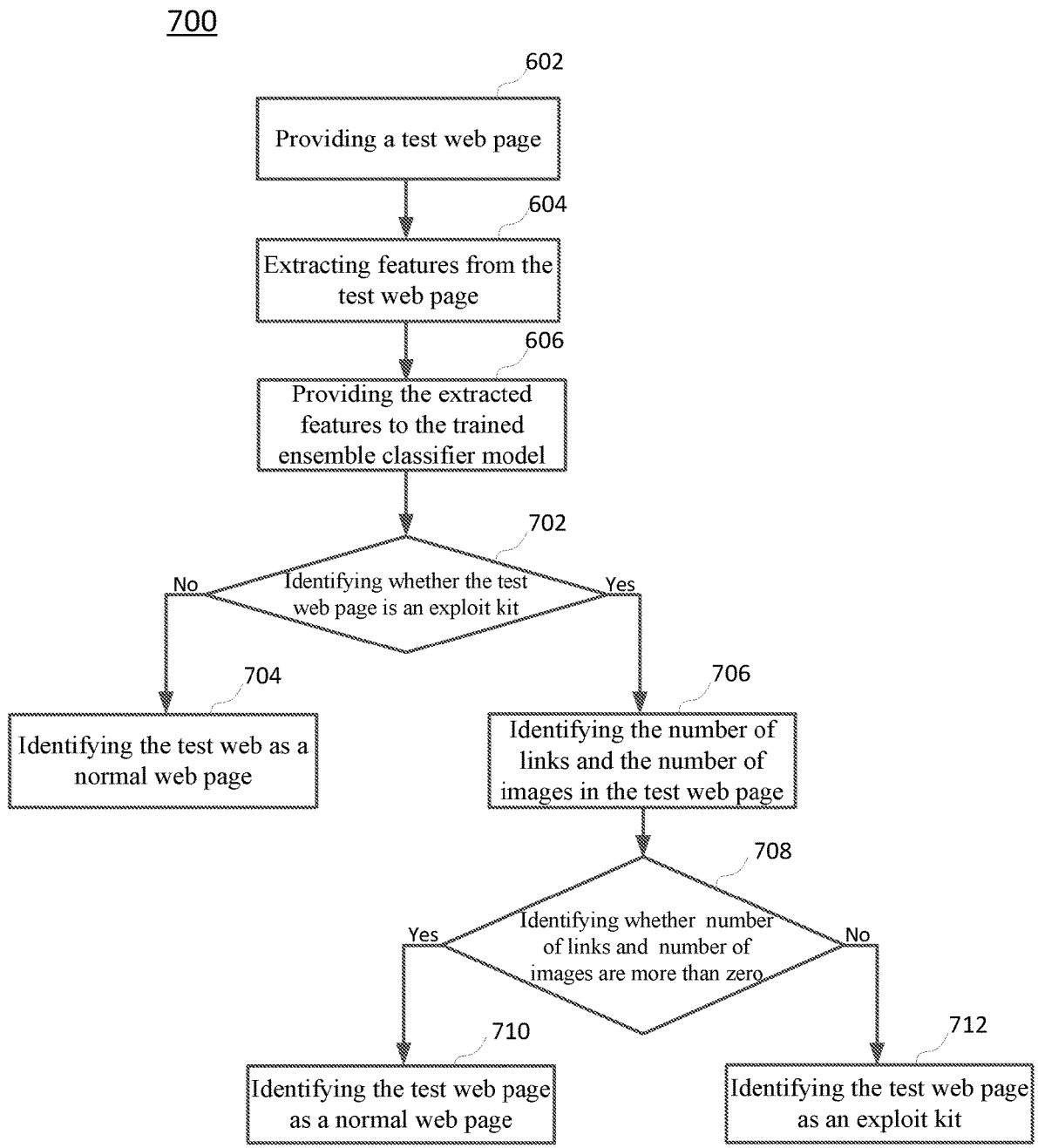
FIG. 7 is another example flowchart illustrating a method 700 of detecting an exploit kit, according to embodiments herein.

FIG. 7 is another example flowchart illustrating a method 700 of detecting an exploit kit, according to embodiments herein. The steps 602-606 are the same as that of the example method 600 shown in FIG. 6. At step 702, the trained ensemble classifier model identifies whether the test web page is an exploit kit or not. If the test web page is not an exploit kit, then at step 704, the test web page is identified as a normal web page. If the test web page is identified as an exploit kit, a further approach is performed to verify whether the decision is correct and reduce false positive rate. At step 706, the additional features, such as the number of links and the number of images in the test web page, are extracted. At step 708, if the number of links and the number of images are more than zero, i.e., there are any links and images in the test web page, then at step 710, the test web page is finally identified as a normal web page. If there are no links and images in the test web page, then at step 712, the test web page is finally identified as an exploit kit. If the test web page is finally identified as a normal web page, an intrusion detection system or intrusion prevention system will allow the network user to access the test web page. On the contrary, if the test web page is finally identified as an exploit kit, an intrusion detection system or intrusion prevention system will block this test web page, and the network user cannot access the test web page.

Figure 8:
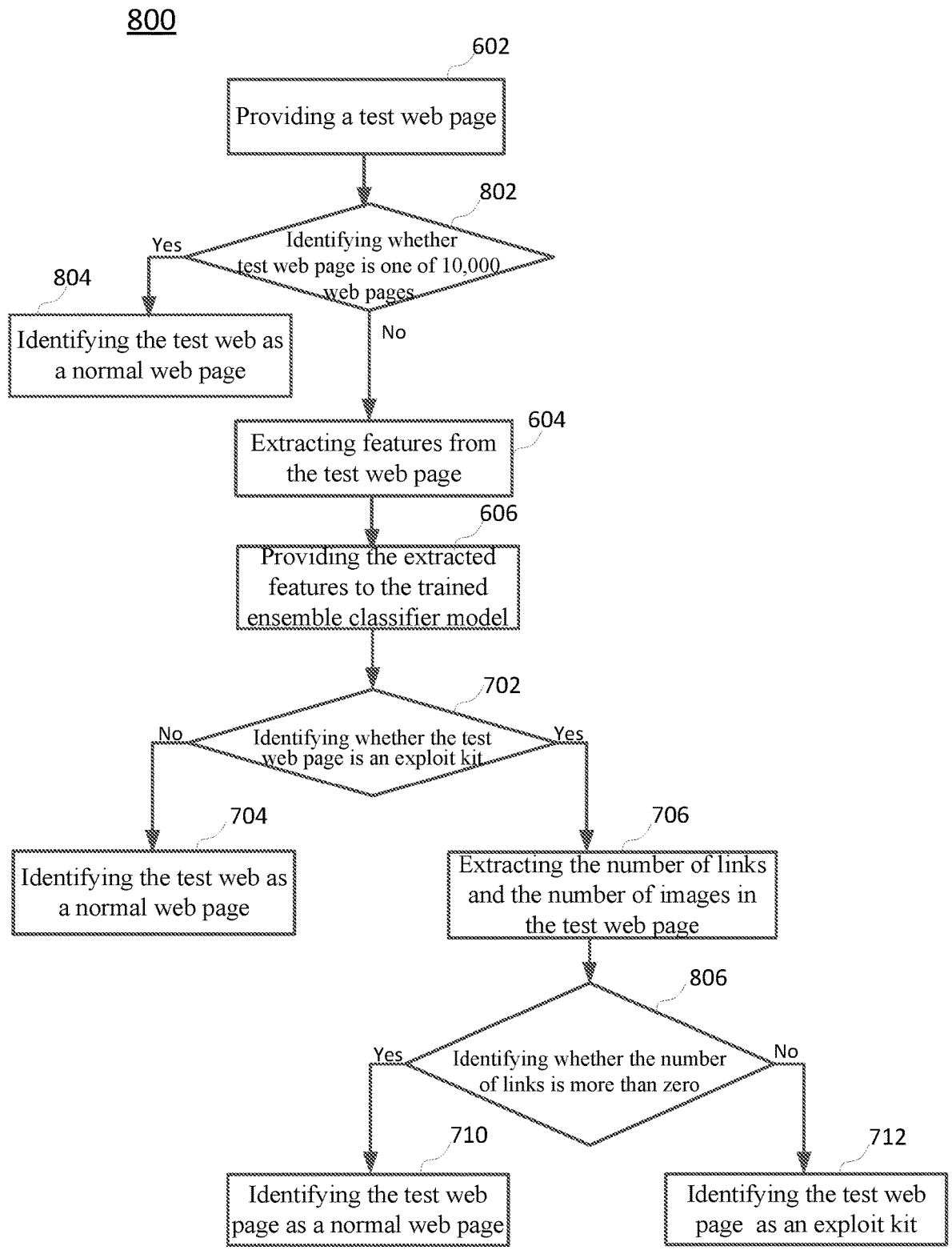
FIG. 8 is another example flowchart illustrating a method 800 of detecting an exploit kit, according to embodiments herein.

FIG. 8 is another example flowchart illustrating a method 800 of detecting an exploit kit, according to embodiments herein. Compared with the example method 700 shown in FIG. 7, the example method 800 includes a further approach to reduce false positive rate. At step 802, if the test web page is one of 10,000 web pages listed by Alexa company, then at step 804, the test web page is identified as a normal web page. If the test web page is not one of 10,000 web pages, then step 604 and the subsequent steps are performed to further identify whether the test web page is an exploit kit or not. Further, instead of extracting the number of links and the number of images, at step 806, only the number of links is extracted. If there are any links in the test web page, then at step 710, the test web page is finally identified as a normal web page. If there are no links in the test web page, then at step 712, the test web page is finally identified as an exploit kit.

Figure 9:
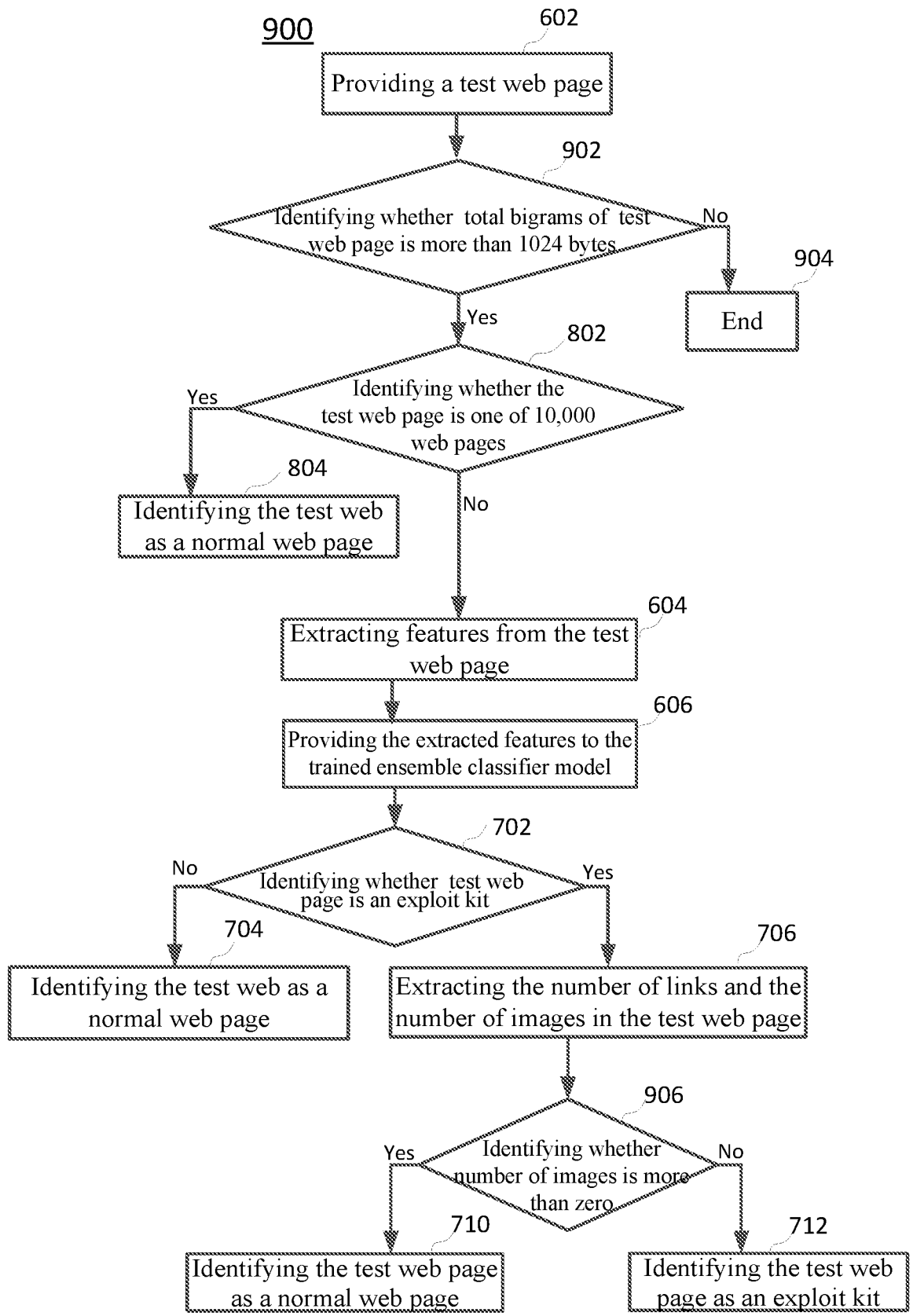
FIG. 9 is another example flowchart illustrating a method 900 of detecting an exploit kit, according to embodiments herein.

FIG. 9 is another example flowchart illustrating a method 900 of detecting an exploit kit, according to embodiments herein. Compared with the example method 800 shown in FIG. 8, the example method 900 includes a further approach to reduce false positive rate. At step 902, if the size of the test web page is more than 1024 bytes, then step 802 and the subsequent steps are performed to further detect whether the test web page is an exploit kit or not. If the size of the test web page is less than 1024 bytes, then at step 904, this test web page is excluded from consideration. In this way, an intrusion detection system or intrusion prevention system could drop web pages quickly if the web pages to be analyzed are less than 1024 bytes, which is meaningless for further analysis. Further, instead of extracting the number of links and the number of images, at step 906, only the number of images is extracted. If there are any images in the test web page, then at step 710, the test web page is finally identified as a normal web page. If there are no images in the test web page, then at step 712, the test web page is finally identified as an exploit kit.

Figure 10:
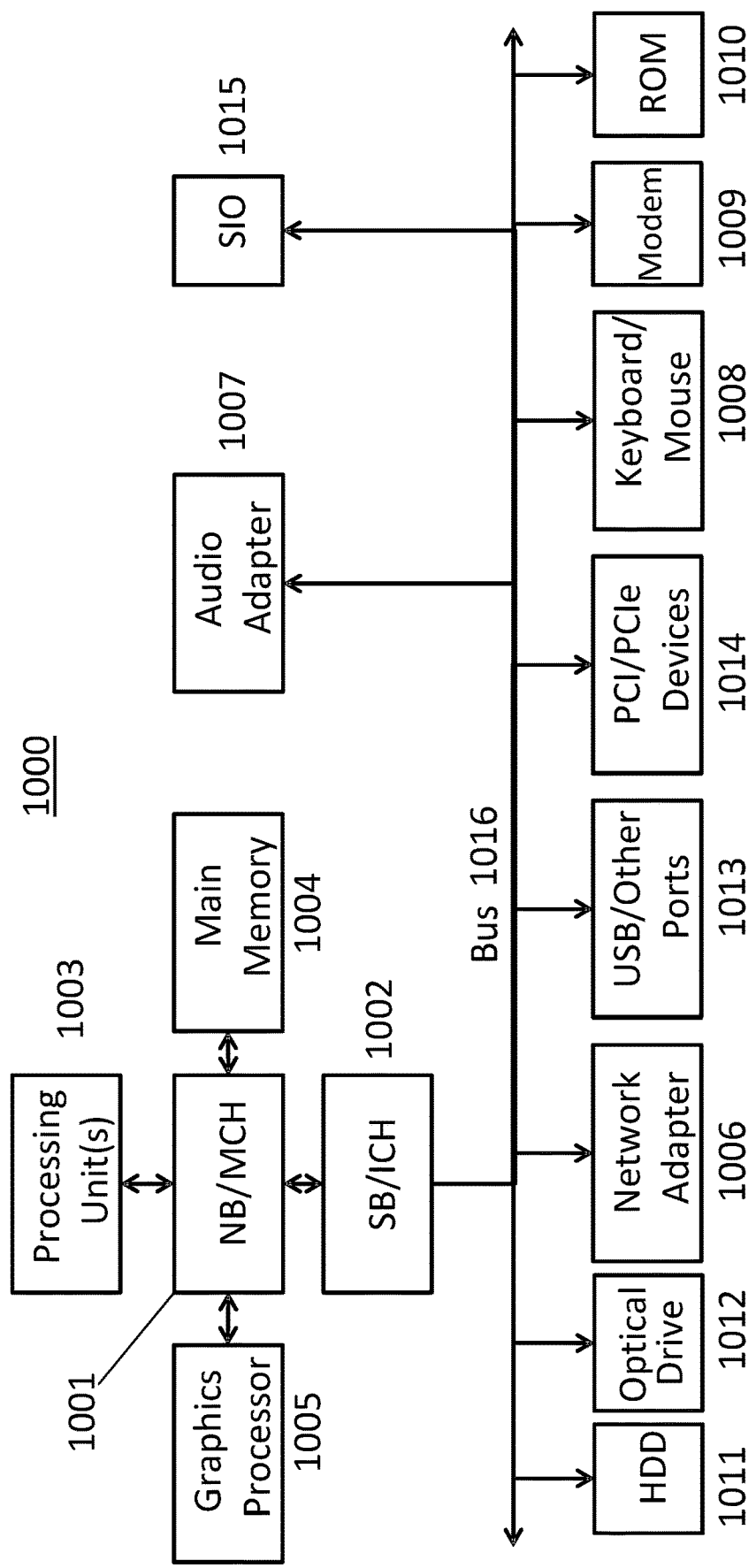
FIG. 10 is a block diagram of an example data processing system 1000 in which aspects of the illustrative embodiments may be implemented.

FIG. 10 is a block diagram of an example data processing system 1000 in which aspects of the illustrative embodiments may be implemented. The data processing system 1000 is an example of a computer, such as a server or client, in which computer usable code or instructions implementing the process for illustrative embodiments of the present invention are located. In one embodiment, FIG. 10 may represent a server computing device.

In the depicted example, data processing system 1000 may employ a hub architecture including a north bridge and memory controller hub (NB/MCH) 1001 and south bridge and input/output (I/O) controller hub (SB/ICH) 1002. Processing unit 1003, main memory 1004, and graphics processor 1005 may be connected to the NB/MCH 1001. Graphics processor 1005 may be connected to the NB/MCH 1001 through an accelerated graphics port (AGP) (not shown in FIG. 10).

In the depicted example, the network adapter 1006 connects to the SB/ICH 1002. The audio adapter 1007, keyboard and mouse adapter 1008, modem 1009, read only memory (ROM) 1010, hard disk drive (HDD) 1011, optical drive (CD or DVD) 1012, universal serial bus (USB) ports and other communication ports 1013, and the PCI/PCIe devices 1014 may connect to the SB/ICH 1002 through bus system 1016. PCI/PCIe devices 1014 may include Ethernet adapters, add-in cards, and PC cards for notebook computers. ROM 1010 may be, for example, a flash basic input/output system (BIOS). The HDD 1011 and optical drive 1012 may use an integrated drive electronics (IDE) or serial advanced technology attachment (SATA) interface. The super I/O (SIO) device 1015 may be connected to the SB/ICH 1002.

An operating system may run on processing unit 1003. The operating system could coordinate and provide control of various components within the data processing system 1000. As a client, the operating system may be a commercially available operating system. An object-oriented programming system, such as the Java™ programming system, may run in conjunction with the operating system and provide calls to the operating system from the object-oriented programs or applications executing on data processing system 1000. As a server, the data processing system 1000 may be an IBM® eServer™ System p® running the Advanced Interactive Executive operating system or the Linux operating system. The data processing system 1000 may be a symmetric multiprocessor (SMP) system that may include a plurality of processors in the processing unit 1003. Alternatively, a single processor system may be employed.

Instructions for the operating system, the object-oriented programming system, and applications or programs are located on storage devices, such as the HDD 1011, and are loaded into the main memory 1004 for execution by the processing unit 1003. The processes for embodiments of the generation system may be performed by the processing unit 1003 using computer usable program code, which may be located in a memory such as, for example, main memory 1004, ROM 1010, or in one or more peripheral devices.

A bus system 1016 may be comprised of one or more busses. The bus system 1016 may be implemented using any type of communication fabric or architecture that may provide for a transfer of data between different components or devices attached to the fabric or architecture. A communication unit such as the modem 1009 or network adapter 1006 may include one or more devices that may be used to transmit and receive data.

Those of ordinary skill in the art will appreciate that the hardware depicted in FIG. 10 may vary depending on the implementation. Other internal hardware or peripheral devices, such as flash memory, equivalent non-volatile memory, or optical disk drives may be used in addition to or in place of the hardware depicted. Moreover, the data processing system 1000 may take the form of a number of different data processing systems, including but not limited to, client computing devices, server computing devices, tablet computers, laptop computers, telephone or other communication devices, personal digital assistants, and the like. Essentially, the data processing system 1000 may be any known or later developed data processing system without architectural limitation.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts or carry out combinations of special purpose hardware and computer instructions.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one may also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers and processes may be implemented using hardware components, software components, and/or combinations thereof. No claim element herein is to be construed under the provisions of 35 U.S.C. 112 (f) unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer implemented method in a data processing system comprising a processor and a memory comprising instructions, which are executed by the processor to cause the processor to implement the method of identifying an exploit kit, the method comprising:
   receiving, by the processor, a web page;
   extracting, by the processor, a plurality of features of the web page; and
   determining, by the processor, whether the web page is associated with an exploit kit, by an ensemble classifier model trained using the extracted features, wherein the determining whether the page is associated with the exploit kit comprises:
      identifying, by the processor, the number of links in the web page; and
      determining, by the processor, that the web page is associated with the exploit kit if the number of links is less than a threshold.

2. The method as recited in claim 1, wherein the plurality of features include one or more of the number of unique n-grams, the total number of n-grams, a ratio of the number of unique n-grams to the total number of n-grams, a file size, and a ratio of the file size to the total number of n-grams.

3. The method as recited in claim 2, wherein the n-grams are bigrams.

4. The method as recited in claim 3, further comprising:
   identifying, by the processor, whether a size of the web page is less than 1024 bytes; and
   eliminating, by the processor, the web page if the size of the web page is less than 1024 bytes.

5. The method as recited in claim 2, further comprising:
   identifying, by the processor, the number of images in the web page; and
   determining, by the processor, that the web page is associated with the exploit kit if the number of images is zero.

6. The method as recited in claim 5 further comprising:
   determining, by the processor, that the web page is associated with the exploit kit if both the number of links and the number of images are zero.

7. The method as recited in claim 2, further comprising:
   identifying, by the processor, whether the web page is one of top ten thousand web pages; and
   determining, by the processor, that the web page is not associated with the exploit kit if the web page is one of top ten thousand web pages.

8. The method as recited in claim 2, further comprising:
   eliminating, by the processor, the web page if the web page is a non-text based web page including compressed objects or executable binary contents.

9. A computer program product for identifying an exploit kit, the computer program product comprising a non-transitory computer readable storage medium having program instructions embodied therewith, the program instructions executable by a processor to cause the processor to:
   receive a web page;
   extract a plurality of features of the web page, wherein the plurality of features include one or more of the number of unique bigrams, the total number of bigrams, a ratio of the number of unique bigrams to the total number of bigrams, a file size, and a ratio of the file size to the total number of bigrams; and
   determine whether the web page is associated with an exploit kit, by an ensemble classifier model trained using the extracted features.

10. The computer program product as recited in claim 9, wherein the trained ensemble classifier model comprises a model generated by a Naïve Bayes classifier and a random rules classifier.

11. The computer program product as recited in claim 10, wherein the processor is further caused to:
   identify the number of links and the number of images in the web page; and
   determine that the web page is associated with the exploit kit if both the number of links and the number of images are zero.

12. The computer program product as recited in claim 11, wherein the processor is further caused to:
   identify whether the web page is one of top ten thousand web pages; and
   determine that the web page is not associated with the exploit kit if the web page is one of top ten thousand web pages.

13. The computer program product as recited in claim 12, wherein the processor is further caused to:
   identify whether a size of the web page is less than 1024 bytes; and
   eliminate the web page if the size of the web page is less than 1024 bytes.

14. The computer program product as recited in claim 9, wherein the processor is further caused to:
   continue to train the trained ensemble classifier model using the determined web page.

15. The computer program product as recited in claim 9, wherein the processor is further caused to:
   continue to train the trained ensemble classifier model using one or more new exploit kits.

16. The computer program product as recited in claim 15, wherein the processor is further caused to:
   remove old exploit kits from the trained ensemble classifier model.

17. The computer program product as recited in claim 9, wherein the processor is further caused to:
   replace the trained ensemble classifier model with a new ensemble classifier model, wherein the new ensemble classifier model is trained by one or more new exploit kits.

18. A system for identifying an exploit kit, comprising:
   a processor configured to:
      receive a web page;
      extract a plurality of features of the web page, wherein the plurality of features include one or more of the number of unique bigrams, the total number of bigrams, a ratio of the number of unique bigrams to the total number of bigrams, a file size, and a ratio of the file size to the total number of bigrams; and
      determine whether the web page is associated with the exploit kit, by an ensemble classifier model trained using the extracted features, wherein the trained ensemble classifier model comprises a model generated by a Nave Bayes classifier and a random rules classifier.

19. The system as recited in claim 18, wherein the processor is further configured to:
continue to train the trained ensemble classifier model using the determined web page and additional one or more new exploit kits.

20. The system as recited in claim 18, the processor is further configured to:
identify whether the web page is one of top ten thousand web pages;
determine that the web page is not associated with the exploit kit if the web page is one of top ten thousand web pages;
identify the number of links and the number of images in the web page; and
determine that the web page is associated with the exploit kit if both the number of links and the number of images are zero.

21. A system for identifying an exploit kit, comprising:
a web page identification module, configured to identify whether a web page is one of top ten thousand web pages and determine that the web page is not associated with the exploit kit if the web page is one of top ten thousand web pages;
a trained ensemble classifier model including a model generated by a Naïve Bayes classifier and a random rules classifier, the trained ensemble classifier model configured to determine whether the web page is associated with the exploit kit;
a filter including a link_count filter and an image-count filter, the filter configured to identify the number of links and the number of images in the web page and determine that the web page is associated with the exploit kit if both the number of links and the number of images are zero.

22. The system as recited in claim 21, wherein the trained ensemble classifier model is continuously trained using the determined web page and additional one or more new exploit kits.

23. An intrusion prevention system, comprising a system for identifying an exploit kit, wherein the system for identifying an exploit kit comprises:
a processor configured to:
receive a web page;
extract a plurality of features of the web page, wherein the plurality of features include one or more of the number of unique bigrams, the total number of bigrams, a ratio of the number of unique bigrams to the total number of bigrams, a file size, and a ratio of the file size to the total number of bigrams;
identify whether the web page is one of top ten thousand web pages;
if the web page is one of top ten thousand web pages, determine that the web page is not associated with the exploit kit;
if the web page is not one of top ten thousand web pages,
detect whether the web page is associated with the exploit kit, through a trained ensemble classifier model based on the extracted features, wherein the trained ensemble classifier model comprises a model generated by a Naïve Bayes classifier and a random rules classifier, and the trained ensemble classifier model is continuously trained using the determined web page and additional one or more new exploit kits;
if the web page is detected by the trained ensemble classifier model as being associated with the exploit kit,
identify the number of images in the web page;
if the number of images is zero,
determine that the web page is associated with the exploit kit; and
block the web page if the web page is determined as being associated with the exploit kit.

24. The intrusion prevention system as recited in claim 23, the processor further configured to:
identify whether a size of the web page is less than 1024 bytes; and
if the size of the web page is less than 1024 bytes, eliminate the web page.

* * * * *